NON-LEAK SAFETY VALVE IN FILLING LINE FOR VEHICLE GASOLINE TANK

Inventor: Thomas A. Godbier, 22475 Cameron St., Castro Valley, Calif. 94546

Filed: Feb. 27, 1973

Appl. No.: 336,252

U.S. Cl............... 141/348, 220/86 R, 251/149.2
Int. Cl............................................. B65d 29/02
Field of Search ............. 141/97, 154, 208, 223, 141/329, 346–350, 369, 370, 372, 379, 382–392, 291–295; 220/36, 86 R; 251/149.2

References Cited
UNITED STATES PATENTS

| | | | |
|---|---|---|---|
| 2,576,192 | 10/1951 | Poznik | 220/86 R |
| 3,259,154 | 7/1966 | Scherer | 141/349 X |
| 3,580,414 | 5/1971 | Ginsburgh et al. | 251/149.2 X |
| 3,730,216 | 5/1973 | Arnett et al. | 251/149.2 X |
| 3,734,149 | 5/1973 | Hansel | 141/350 |

Primary Examiner—Houston S. Bell, Jr.
Assistant Examiner—Frederick R. Schmidt
Attorney, Agent, or Firm—William R. Piper

[57] ABSTRACT

A non-leak safety valve placed in the filling line for a vehicle gasoline tank and comprising a flexible sealing disc that normally extends across the filling line for a vehicle gasoline tank to prevent the escape of gasoline from the tank should the vehicle tip over due to an accident. Novel means is provided for permitting the upper portion of the flexible sealing disc to be bent inwardly by the delivery nozzle of a gasoline pump hose for opening the valve when an operator inserts the end of the nozzle into the tank filling line and presses the nozzle against the flexible sealing disc. Novel means is also provided for guiding the nozzle as it enters the tank filling line so that it will only contact the upper portion of the flexible disc for swinging it inwardly. Spring means returns the disc to closed position when the nozzle is retracted.

2 Claims, 4 Drawing Figures

PATENTED SEP 17 1974    3.835.900

NON-LEAK SAFETY VALVE IN FILLING LINE FOR VEHICLE GASOLINE TANK

BACKGROUND OF THE INVENTION

1. Field of the Invention

Many venicle accidents result in the gasoline tank being tipped over or at such an angle that the gasoline drains out and frequently the spilled gasoling is ignited by a spark with the result that the vehicle is burnt and should any of the occupants of the vehicle be trapped from getting out, they would also be burned. The present invention has been designed to prevent any accidental spilling of gasoline from the vehicle tank regardless of the position of the tank. Another advantage of the device is that the spring-biased upper portion of the flexible sealing disc can be swung into open position when a gasoline deliver nozzle is inserted into the tank filling line, this upper disc portion will remain closed should anyone insert a rubber hose into the filling line for the purpose of siphoning gasoline from the tank. The spring means will exert a sufficient force to prevent the rubber hose from swinging the upper portion of the flexible disc inwardly for opening the valve.

2. Description of the Prior Art

The patent to Hans Hoss, on a fueling device, U.S. Pat. No 3,133,566, discloses a vehicle tank with a filling line that has a coupling element at its outer end, this element housing a spring-biased valve. A gasoline filling hose from a gasoline pump has a coupling element at its outer end which has a spring-biased valve therein. When the two coupling elements are interconnected, their respective valves are opened and gasoline may be pumped directly into the vehicle tank. However, when a standard nozzle valve is connected to the hose, the coupling element on the hose must first be removed. Then an intermediate element with a spring-pressed valve therein must be connected to the coupling element on the tank filling line and this will open both spring-pressed valves relative to each other. The nozzle may now be inserted into the intermediate element for delivering gasoline from the pump and into the vehicle tank.

The present invention does not make use of any coupling element permanently attached to the filling line of a vehicle gasoline tank. A non-leak safety valve of novel construction is mounted in the gasoline tank filling line and will prevent the accidental spilling of the gasoline from the tank should the tank be tilted or turned upside down for any reason, such as by an accident to the vehicle. Moreover, the non-leak safety valve can be opened by the end of a gasoline delivery nozzle when an operator inserts the nozzle into the open end of the tank filling line and presses the nozzle against the valve for opening it for delivering gasoline from a pump into the tank.

SUMMARY OF THE INVENTION

An object of my invention is to provide a nonleak safety valve of novel construction that may be readily mounted in the filling line of a gasoline vehicle tank. The valve is spring-biased so as to be kept normally closed. The valve can be opened when a filling nozzle from a gasoline pump has its end inserted into the gasoline filling line and pressed against the valve. The valve cannot be opened by a rubber tube which a person might try to insert into the filling line for the purpose of siphoning gasoline from the tank.

A further object of my invention is to provide a non-leak safety valve that includes a flexible disc which extends across the filling line for a vehicle gasoline tank. A portion of the flexible disc is held in a fixed position while the remaining portion may be flexed inwardly by an operator inserting a gasoline filling nozzle into the filling line and pressing the end of the nozzle against that portion of the disc that can be flexed inwardly for opening the valve. Novel means is provided for guiding the end of the nozzle toward that portion of the flexible disc that can be flexed inwardly and spring means is used for returning the flexed portion of the disc to a closed position when the nozzle is withdrawn from the filling line.

DESCRIPTION OF THE PREFERRED EMBODIMENT

Figure 1:
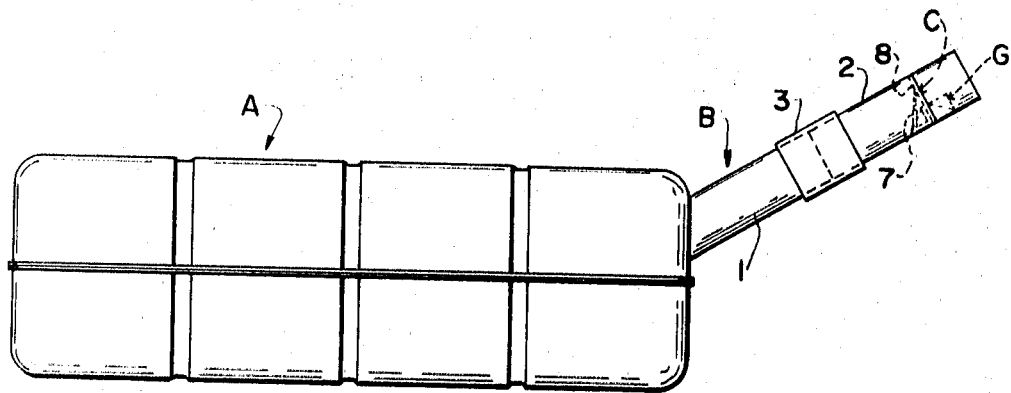
FIG. 1 shows a vehicle tank with a gasoline filling line and my non-leak safety valve is mounted near the entrance end of the filling line and is shown by dotted lines.

In carrying out my invention I show a vehicle tank indicated generally at A in FIG. 1, and this tank is provided with a gasoline filler line B. The filler line or inlet pipe is in two parts, a lower tubular part 1, that is welded to the tank A, and an outer tubular part 2 that is connected to the part 1, by a coupling sleeve 3. My non-leak safety valve is mounted in the outer tubular part 2 and it now will be described in detail.

Figure 2:
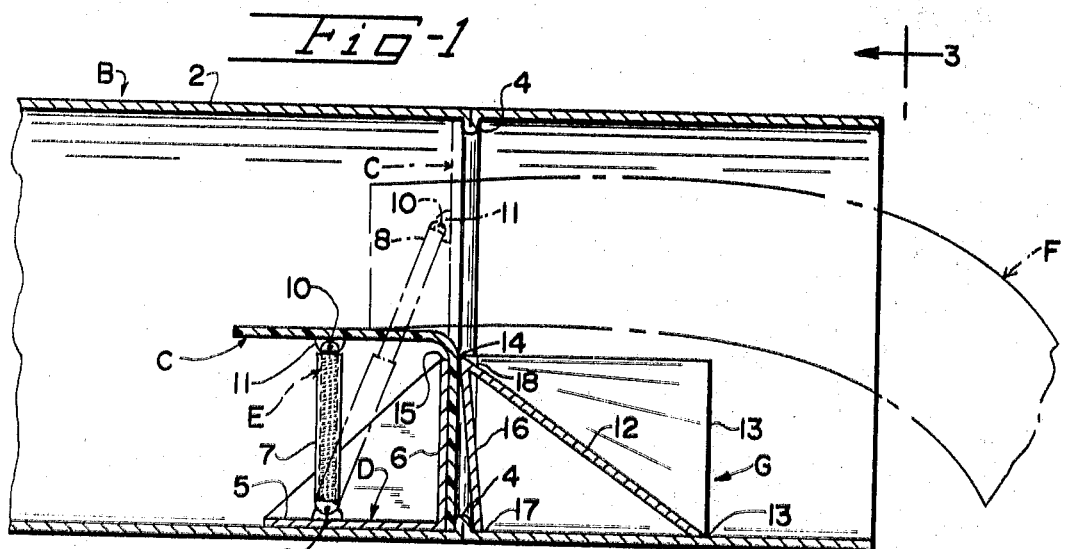
FIG. 2 is an enlarged longitudinal section through the filling line and non-leak safety valve. The valve has been swung into open position by the gasoline delivery nozzle. The closed position of the valve is indicated by the dot-dash lines.

FIG. 2 shows the outer tubular part 2 as having an inwardly extending annular flange 4. I have formed this annular flange by folding a portion of the tubular part 2 inwardly, although I do not wish to be confined to any particular manner in forming the annular flange. A flexible disc C has an outer diameter equal to the inner diameter of the tubular part 2 of the filling line B. This flexible disc C normally extends across the tubular part 2 of the filling line and bears against the inner side of the annular flange 4. The flexible disc C functions as a valve and the inwardly extending annular flange 4 constitutes a valve seat against which the valve C normally bears. The flexible disc valve C is preferably made of rubber, but I do not wish to be confined to any particular material.

The lower portion of the flexible disc valve C is held against the adjacent portion of the inwardly extending flange 4 by a member D, see FIG. 2. The member D has a base portion 5 that is welded to the inner surface of the tubular part 2 of the gasoline filling line B, and it has a partial disc-shaped end wall 6 that bears against the adjacent portion of the flexible disc valve C and holds it in a liquid-tight contact with the flange 4. If desired, the wall 6 may be sealed to the disc C. If desired, the base 5 of the member D may be semi-cylindrical in shape so as to extend around the semi-circular edge of the wall 6.

The upper portion of the flexible disc valve C is yieldingly held against the adjacent portion of the flange 4 so as to provide a non-leak safety valve for the filling line B and will prevent any leakage of gasoline from the tank A, regardless of the position the tank might assume in case of a vehicle accident. A compression coil spring E is housed within a pair of telescopic casings 7 and 8, see FIG. 2. The lower outer casing 7 for the spring E is pivoted at 9 to the base 5 of the member D. The upper inner telescopic casing for the spring E is pivoted at 10 to a bracket 11 that is cemented to the upper portion of the disc valve C. When a nozzle F from a gasoline delivery hose, not shown, is pressed against the upper portion of the flexible disc valve C, it will swing the upper valve portion inwardly, as shown in FIG. 2, and the inner telescoping casing part 8 will move into the outer telescoping casing part 7 as the compression spring E is compressed during the inward swinging of the upper portion of the disc valve. As soon as the nozzle F is withdrawn from the filling line B and frees the upper portion of the disc valve C, the compressed spring E will return the upper disc valve portion to closed position where it will make a liquid tight seal against the flange 4.

Figure 3:
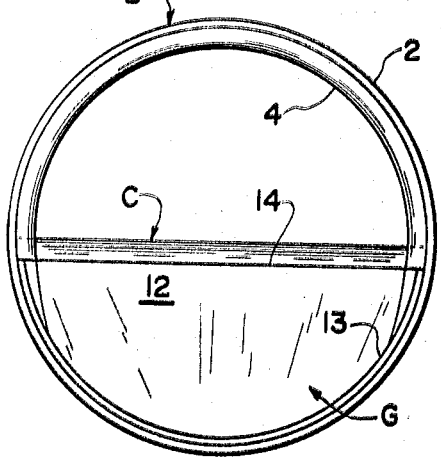
FIG. 3 is an end view of FIG. 2 when looking in the direction of the arrows 3—3 in FIG. 2.
Figure 4:
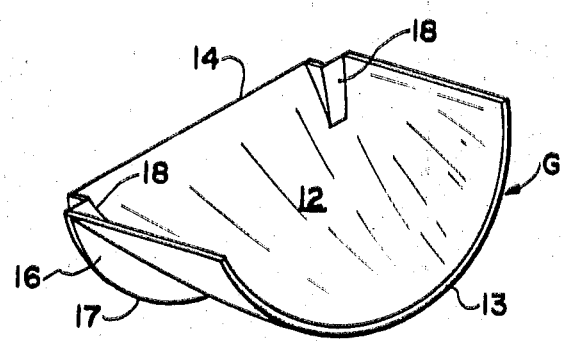
FIG. 4 is an isometric view of the nozzle guide that is positioned in front of the lower portion of the valve.

I provide novel means for guiding the filling nozzle F away from the lower fixed portion of the disc valve C and to cause the nozzle to press against only the upper, inwardly swingable portion of the valve as the gasoline operator inserts the nozzle into the filler line preparatory to delivering gasoline into the tank A. In FIGS. 2, 3 and 4, I disclose a nozzle guide, indicated generally at G. This nozzle guide has an upwardly inclined portion 12 whose front edge 13 is in the shape of a half circle. The rear edge 14 of the upwardly inclined portion 12 is in the form of a straight line that parallels the top edge 15 of the wall 6 of the member D, see FIG. 2. The nozzle guide G has a rear disc-shaped supporting wall 16 for the upwardly inclined portion 12 and this wall 16 extends downwardly from the straight edge 14 and has its peripheral edge 17 welded to the inner surface of the outer tubular part 2 of the filler line B. The semi-circular front edge 13 of the nozzle guide G is likewise welded to the tubular part 2.

The arcuate edge 17 of the disc-shaped supporting wall 16 bears against the annular flange 4, while the upper straight edge 14 of the upwardly inclined portion 12 contacts the adjacent side of the flexible disc valve C, see FIG. 2. In FIG. 4, I illustrate an isometric view of the nozzle guide G in order to show how the two corners, one at each end of the straight edge 14, are shaped at 18 to accommodate and receive the adjacent portions of the annular flange 4.

OPERATION

From the foregoing description of the various parts of the device, the operation thereof may be readily understood. A cap, not shown, normally closes the outer end of the filler line B to the vehicle tank A. The non-leak safety valve disc C extends across the outer tubular member 2 of the filler line and makes a liquid tight seal against the inwardly extending annular flange 4. Then in case of a vehicle accident and the tank A be tilted into a position where normally the gasoline would spill out through the filler line and increase the fire hazard by possible being ignited by a spark, the closed non-leak safety valve C would prevent any gasoline leakage.

The non-leak safety valve does not prevent the normal filling of the tank A with gasoline by inserting the nozzle F into the open end of the filler line B. The nozzle guide G will prevent the nozzle F from striking the lower portion of the disc valve C and instead will guide the nozzle so that it will contact the upper portion of the disc C and will swing this portion inwardly, as shown in FIG. 2, this swinging motion of the disc causing the spring E to be compressed within its telescopic casing. As soon as the nozzle F is withdrawn from the filler line B, the spring E will immediately return the disc to its closed position. The compression spring E is strong enough to prevent the disc valve C from being opened when a rubber tube is inserted into the filler line by an unauthorized person with the intent of siphoning gasoline from the tank.

Another feature of the non-leak safety valve is that gasoline will not spill out of the tank and run down the side of the car causing the paint to discolor because the valve will prevent such leakage.

I claim:

1. A non-leak safety valve for preventing the accidental leakage of liquid fuel from a vehicle tank and comprising:
   a. a tubular fuel inlet pipe for the tank and having an inwardly extending annular flange spaced inwardly from the outer end of said pipe;
   b. a flexible disc valve bearing against the side of said annular flange that faces toward the tank for making a liquid tight seal against the flange for preventing any leakage of liquid fuel from the tank;
   c. means for holding the lower portion of said flexible disc valve permanently against the adjacent portion of said annular flange, the upper portion of said flexible disc valve being free to swing inwardly when a gasoline filling nozzle is pressed against this portion for opening the upper half of the valve;
   d. spring means for swinging the upper portion of said flexible disc valve against said annular inwardly extending flange for closing the valve when the gasoline filling nozzle is withdrawn from the fuel inlet pipe;
   e. a nozzle guiding member positioned in the inlet pipe and in front of the lower fixed portion of said flexible disc valve and having an upwardly inclined surface for guiding the nozzle away from the lower half of said flexible valve and into contact with the upper half of the valve for swinging only the upper valve half inwardly when the nozzle is inserted into the inlet pipe.

2. The combination as set forth in claim 1: and in which
   a. the upwardly inclined surface in the nozzle guiding member having a semi-circular front edge that contacts with the adjacent inner surface of the inlet pipe; and
   b. the rear edge of said upwardly inclined surface being in a straight line that contacts the adjacent portion of said flexible disc valve.

* * * * *